UNITED STATES PATENT OFFICE 2,225,651

AZO COMPOUNDS AND FIBER DYED THEREWITH

James G. McNally and Joseph B. Dickey, Rochester, N. Y., assignors to Eastman Kodak Company, Rochester, N. Y., a corporation of New Jersey No Drawing. Application November 2, 1938, Serial No. 238,411

12 Claims. (Cl. 260—205)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

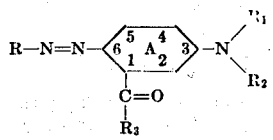

wherein R represents the residue of an aromatic nucleus, $R_1$ represents hydrogen, an alkyl group, an allyl group, a cycloalkyl group, an aryl group or a heterocyclic group, $R_2$ represents an alkyl group, an allyl group, a cycloalkyl group, an aryl group or a heterocyclic group, $R_3$ represents an alkyl group, an aryl group, or a heterocyclic group and A means the benzene nucleus so designated may be substituted in the 2-, 4- and 5-positions (these positions being as indicated) with a monovalent substituent such as a halogen atom, an alkyl group, an alkoxy group, an aryl group, an aryloxy group, an amino group, or a substituted amino group such as an alkylamino group, for example.

It will be understood that alkyl as used herein, unless otherwise stated, includes not only unsubstituted alkyl groups such as a methyl group, an ethyl group, or a propyl group but also substituted alkyl groups such as β-hydroxyethyl, β,γ-hydroxy-propyl, β-methoxyethyl or β-ethoxyethyl, for example. Illustrative of halogen may be mentioned chlorine, bromine, and iodine. Similarly, illustrative alkoxy groups include methoxy, ethoxy and propoxy. Illustrative of cycloalkyl and aryloxy may be mentioned cyclohexyl and phenoxy respectively.

The azo dye compounds of our invention can be prepared by diazotizing a primary aromatic amine and coupling the diazonium compound obtained with a coupling compound having the general formula:

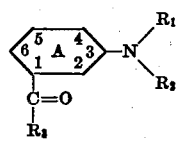

wherein A, $R_1$, $R_2$ and $R_3$ have the meaning previously assigned to them.

As previously indicated, the nuclear non-sulfonated aromatic azo dye compounds of our invention constitute valuable dyes for the coloration of organic derivatives of cellulose, such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose, such as cellulose acetate silk, nuclear non-sulfonated compounds wherein R is a phenyl residue are generally advantageous. Said phenyl residue may be substituted as clearly shown herein.

The following examples illustrate the preparation of the azo dye compounds of our invention:

Example 1

11.1 grams of o-fluoroaniline are dissolved in 100 cc. of water containing 25 cc. of 36% hydrochloric acid. Ice is added and the amine is diazotized at a temperature of 0–5° C. by adding, with stirring, 6.9 grams of sodium nitrite dissolved in water.

19.3 grams of 4-methoxy-3-dimethylaminophenylmethyl ketone are dissolved in 100 grams of ice and water containing 10 cc. of 36% hydrochloric acid, and the diazo solution prepared above is added. After standing for a time, the mixture is slowly made neutral to Congo red paper with sodium acetate, and when coupling is complete the dye compound formed is filtered, washed with water, and dried. The azo dye compound obtained colors cellulose acetate silk a yellow shade.

Example 2

17.1 grams of 1-amino-4-fluoro-2-hydroxyethoxybenzene are diazotized as described in Example 1.

21.7 grams of 4-methyl-3-methylpropylaminophenylmethyl ketone are dissolved in dilute hydrochloric acid and coupling is carried out as described in Example 1. The azo dye compound obtained colors cellulose acetate silk a yellow shade.

Example 3

13.8 grams of p-nitroaniline are suspended in 150 cc. of water containing 40 cc. hydrochloric acid. Some ice is added and the amine is diazotized with 6.9 grams of sodium nitrite.

30 grams of 4-phenyl-3-glycerylaminophenylethyl ketone are dissolved in dilute hydrochloric acid and coupling is carried out as described in Example 1. The coupling may be carried out in acetic acid or alcohol if desired. The azo dye compound obtained colors cellulose acetate silk an orange-red shade.

Example 4

21.7 grams of p-nitro-o-bromoaniline are diazotized as described in Example 3.

30.3 grams of 4-chloro-3-ethyl-β-hydroxyethylaminobenzophenone are dissolved in dilute hydrochloric acid and coupling is carried out as previously described. The azo dye compound obtained colors cellulose acetate silk a red shade.

Example 5

0.1 gram mole of 2-amino-5-nitrophenol are diazotized as described in Example 3.

0.1 gram mole of 4-β-hydroxyethoxy-3-di-β-hydroxyethyl-aminophenylmethyl ketone are dissolved in dilute hydrochloric acid and coupling is carried out as described in Example 1. The azo dye compound obtained colors cellulose acetate silk a pinkish-red shade.

Example 6

13.5 grams of p-aminoacetophenone are diazotized as described in Example 1.

30.9 grams of 4-methoxy-2-methyl-3-phenyl-β-hydroxyethylaminophenylmethyl ketone are dissolved in dilute hydrochloric acid and coupling is carried out as previously described. The azo dye compound obtained colors cellulose acetate silk a yellowish-orange shade.

Example 7

37.5 grams of 4,5-dimethoxy-3-cyclohexyl sodium-β-sulfoethyl aminophenylmethyl ketone are dissolved in water and with dilute hydrochloric acid and a diazo solution prepared by diazotizing 25.5 grams of

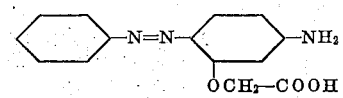

is added. Coupling is carried out as previously described. The azo dye compound obtained colors cellulose acetate silk an orange shade.

Example 8

27.6 grams of di-o-anisidine are diazotized in 20% hydrochloric acid in the cold with 13.89 grams of sodium nitrite and neutralized to Congo red paper with sodium acetate.

76.6 grams of

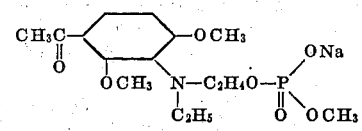

are dissolved in cold water, ice is added, and the diazo solution prepared as described is added with stirring. The mixture is made neutral to Congo red paper with sodium acetate. When complete, the dye is salted out, filtered, and dried. The azo dye compound obtained colors cellulose acetate silk an orange shade.

Example 9

(A) 7.6 grams of powdered sodium nitrite are dissolved in 53 cc. of sulfuric acid (sp. gr. 1.84). After the addition, the solution is warmed to not over 70° C. and cooled to 10–15° C.

(B) 26.2 grams of 2,4-dinitro-6-bromoaniline are dissolved in 250 cc. of hot acetic acid. The hot acetic acid solution is then cooled rapidly to room temperature.

While stirring solution A, add mixture B over a period of thirty minutes, maintaining a temperature of 15–10° C. After the addition, stir the resulting solution for several hours and then add 1 gram of urea.

42.9 grams of

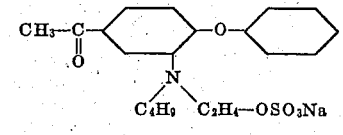

are dissolved in acetic acid and the diazo solution prepared as described above is added. The free mineral acid is neutralized with sodium acetate. When coupling is complete the dye is salted out after the addition of water, filtered and dried. The azo dye compound obtained colors cellulose acetate silk a violet shade.

Example 10

7.2 grams of sodium nitrite are added to 62 cc. sulfuric acid (sp. gr. 1.84). The solution is cooled and 22.8 grams of 2,4,6-trinitroaniline (finely powdered) are added. The suspension is cooled and stirred for one hour and then at room temperature until a drop added to water no longer gives a precipitate.

0.1 gram mole of:

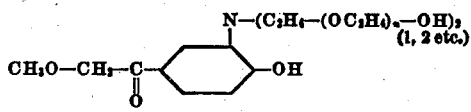

are dissolved in acetic acid and coupling is carried out as described in Example 9. The azo dye compound obtained colors cellulose acetate silk a reddish-blue shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 10, inclusive.

| Amine | Coupling component | Color on cellulose acetate silk |
|---|---|---|
| o-Chloroaniline | (1) $CH_3C(O)$—C$_6H_3$(OCH$_3$)—N(CH$_3$)(CH$_3$) | Yellow. |
| Do | (2) $CH_3C(O)$—C$_6H_3$(CH$_3$)—N(C$_3H_7$)(CH$_3$) | Do. |
| Do | (3) $C_2H_5C(O)$—C$_6H_3$(C$_6H_5$)—N(H)(CH$_2$—CHOH—CH$_2$OH) | Do. |
| Do | (4) $C_6H_5C(O)$—C$_6H_3$(Cl)—N(C$_3H_7$)(C$_2H_4$OH) | Do. |
| Do | (5) $CH_3C(O)$—C$_6H_3$(O—C$_2H_4$OH)—N(C$_2H_4$OH)$_2$ | Do. |
| Do | (6) $CH_3C(O)$—C$_6H_3$(OCH$_3$)(OCH$_3$)—N(C$_2H_4SO_3Na$)(C$_6H_{11}$ cyclohexyl) | Do. |
| Do | (7) $CH_3C(O)$—C$_6H_2$(OCH$_3$)(OCH$_3$)—N(H—C$_2H_4$—O—P(ONa)(OCH$_3$))(C$_2H_5$) | Do. |
| Do | (8) $CH_3C(O)$—C$_6H_3$(O—C$_6H_5$)—N(C$_2H_4$—O—SO$_3Na$)(C$_4H_9$) | Do. |
| Do | (9) $CH_3C(O)$—C$_6H_4$—N(C$_2H_4OH$)(C$_2H_4OH$) | Do. |
| m-Nitroaniline | Coupling components 1–9 above | Orange. |
| 3-nitro-5-methoxy-aniline | do | Do. |
| 3-nitro-5-methyl or -5-halo (F, Cl, Br) aniline | do | Do. |
| p-Aminoacetophenone | do | Do. |
| H$_2$N—S(O)$_2$—C$_6H_4$—NH$_2$ | do | Yellowish-orange. |
| H$_2$N—C(O)—C$_6H_4$—NH$_2$ | do | Do. |
| p-Nitroaniline | do | Red. |
| p-Nitro-o-methyl aniline | do | Do. |

| Amine | Coupling component | Color on cellulose acetate silk |
| --- | --- | --- |
| p-Nitro-o-(F, Cl, Br)-aniline | Coupling components 1-9 above | Rubine. |
| 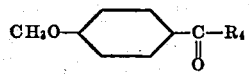 | do | Red. |
| 2-amino-5-nitrophenyl-methyl sulfone | do | Rubine. |
| 2,4-di(chloro, fluoro, bromo) aniline | do | Orange. |
| 2-halo-4-(alkyl, alkoxy) aniline | do | Orange-yellow. |
| o-Nitroaniline | do | Red. |
| o-Nitro-p-(alkoxy, halo, alkyl) aniline | do | Do. |
| 2,4-dinitroaniline | do | Purple. |
| 2,4-dinitro-6-(F, Cl, Br) aniline | do | Violet. |
| 2,4,6-trinitro-aniline | do | Blue. |
| 2,4-dinitro-α-naphthylamine | do | Do. |
| p-Aminoazobenzene | do | Rubine. |
| 2,6-dichloro-4-nitroaniline | do | Do. |
| 2,6-dialkoxy-4-nitroaniline | do | Do. |

In order that the preparation of the azo dye compounds of our invention may be clearly understood, the preparation of a number of the coupling components ordinarily used in their preparation is given hereinafter. Compounds having the general formula:

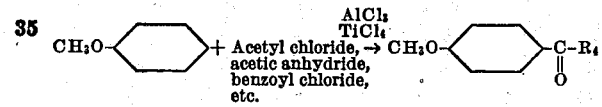

wherein $R_4$ represents an alkyl group, a heterocyclic group, or an aryl group may be prepared by employing the well known Friedel and Craft's reaction. The reaction which takes place may be represented as follows:

$$CH_3O-\langle\rangle + \text{Acetyl chloride,} \xrightarrow[\text{TiCl}_4]{\text{AlCl}_3} CH_3O-\langle\rangle-C-R_4$$
acetic anhydride,
benzoyl chloride,
etc.

The ketone compounds thus prepared may be nitrated after the general method of Org. Syn., vol. 10, page 74, following which the nitro group may be reduced to an amino group in accordance with known reduction methods. By treatment of these amino aryl ketone compounds by methods known for the introduction of an alkyl, an allyl, a cycloalkyl, and an aryl group, for example, said groups may be caused to replace one or more hydrogen atoms of the amino group and the compounds resulting are coupling compounds employed in the preparation of the azo dye compounds of our invention.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

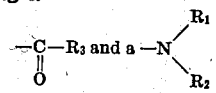

group attached thereto in ortho and para position, respectively, to the azo bond and wherein $R_3$ represents the residue of a member selected from the group consisting of an alkyl group and a phenyl nucleus, $R_1$ represents a member selected from the group consisting of hydrogen, an alkyl group, an allyl group, a cyclohexyl group and a phenyl nucleus and $R_2$ represents a member selected from the group consisting of an alkyl group, an allyl group, a cyclohexyl group and a phenyl nucleus.

2. The azo dye compounds having the general formula: R—N=N—B wherein R represents the residue of an aryl nucleus of the benzene series containing but one benzene ring, B represents the residue of an aryl nucleus of the benzene series containing but one benzene ring and having a

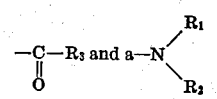

group attached thereto in ortho and para position, respectively, to the azo bond, and wherein $R_3$ represents the residue of a member selected from the group consisting of an alkyl group and a phenyl nucleus, $R_1$ represents a member selected from the group consisting of hydrogen, an alkyl group, an allyl group, a cyclohexyl group and a phenyl nucleus and $R_2$ represents a member selected from the group consisting of an alkyl group, an allyl group, a cyclohexyl group and a phenyl nucleus.

3. The azo dye compounds having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

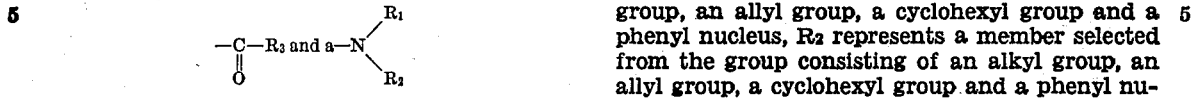

group attached thereto in ortho and para position, respectively, to the azo bond, and wherein R₃ represents an alkyl group, R₁ represents a member selected from the group consisting of hydrogen, an alkyl group, an allyl group, a cyclohexyl group and a phenyl nucleus and R₂ represents a member selected from the group consisting of an alkyl group, an allyl group, a cyclohexyl group and a phenyl nucleus.

4. The azo dye compounds having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

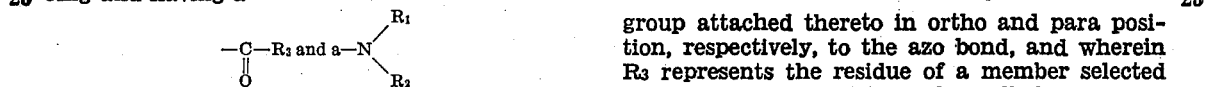

group attached thereto in ortho and para position, respectively, to the azo bond, and wherein R₃ represents a phenyl nucleus, R₁ represents a member selected from the group consisting of hydrogen, an alkyl group, an allyl group, a cyclohexyl group and a phenyl nucleus and R₂ represents a member selected from the group consisting of an alkyl group, an allyl group, a cyclohexyl group and a phenyl nucleus.

5. The azo dye compounds having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

group attached thereto in ortho and para position, respectively, to the azo bond and wherein R₃ represents the residue of a member selected from the group consisting of an alkyl group and a phenyl nucleus.

6. The azo dye compounds having the general formula: R—N=N—B wherein R represents the residue of an aryl nucleus of the benzene series containing but one benzene ring, B represents the residue of an aryl nucleus of the benzene series containing but one benzene ring and having a

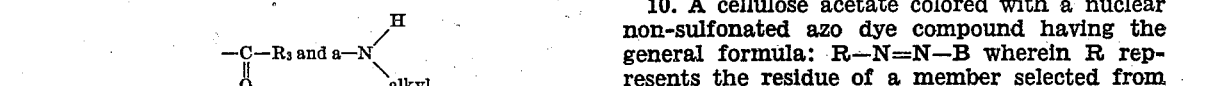

group attached thereto in ortho and para position, respectively, to the azo bond and wherein R₃ represents the residue of a phenyl nucleus.

7. The azo dye compounds having the general formula:

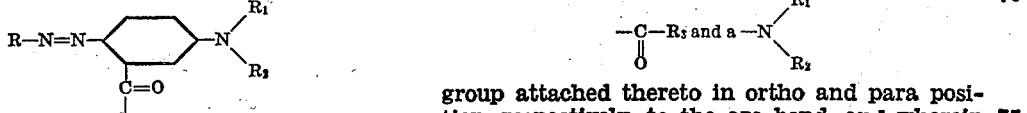

wherein R represents the residue of an aryl nucleus of the benzene series containing but one benzene ring, R₁ represents a member selected from the group consisting of hydrogen, an alkyl group, an allyl group, a cyclohexyl group and a phenyl nucleus, R₂ represents a member selected from the group consisting of an alkyl group, an allyl group, a cyclohexyl group and a phenyl nucleus and R₃ represents the residue of a member selected from the group consisting of an alkyl group and a phenyl nucleus.

8. Material made of or containing an organic derivative of cellulose colored with a nuclear non-sulfonated azo dye compound having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

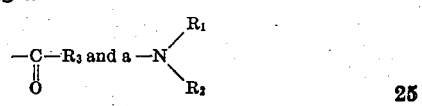

group attached thereto in ortho and para position, respectively, to the azo bond, and wherein R₃ represents the residue of a member selected from the group consisting of an alkyl group and a phenyl nucleus, R₁ represents a member selected from the group consisting of hydrogen, an alkyl group, an allyl group, a cyclohexyl group and a phenyl nucleus and R₂ represents a member selected from the group consisting of an alkyl group, an allyl group, a cyclohexyl group and a phenyl nucleus.

9. Material made of or containing an organic derivative of cellulose colored with a nuclear non-sulfonated azo dye compound having the general formula: R—N=N—B wherein R represents the residue of an aryl nucleus of the benzene series containing but one benzene ring, B represents the residue of an aryl nucleus of the benzene series containing but one benzene ring and having a

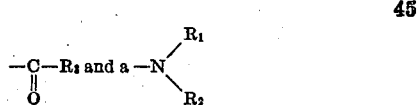

group attached thereto in ortho and para position, respectively, to the azo bond, and wherein R₃ represents the residue of a member selected from the group consisting of an alkyl group and a phenyl nucleus, R₁ represents a member selected from the group consisting of hydrogen, an alkyl group, an allyl group, a cyclohexyl group and a phenyl nucleus and R₂ represents a member selected from the group consisting of an alkyl group, an allyl group, a cyclohexyl group and a phenyl nucleus.

10. A cellulose acetate colored with a nuclear non-sulfonated azo dye compound having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

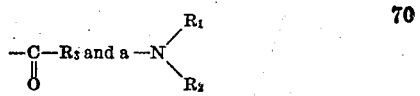

group attached thereto in ortho and para position, respectively, to the azo bond, and wherein $R_3$ represents the residue of a member selected from the group consisting of an alkyl group and a phenyl nucleus, $R_1$ represents a member selected from the group consisting of hydrogen, an alkyl group, an allyl group, a cyclohexyl group and a phenyl nucleus and $R_2$ represents a member selected from the group consisting of an alkyl group, an allyl group, a cyclohexyl group and a phenyl nucleus.

11. A cellulose acetate colored with a nuclear non-sulfonated azo dye compound having the general formula: R—N=N—B wherein R represents the residue of an aryl nucleus of the benzene series containing but one benzene ring, B represents the residue of an aryl nucleus of the benzene series containing but one benzene ring and having a

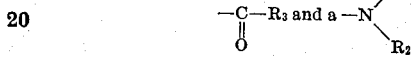

group attached thereto in ortho and para position, respectively, to the azo bond, and wherein $R_3$ represents the residue of a member selected from the group consisting of an alkyl group and a phenyl nucleus, $R_1$ represents a member selected from the group consisting of hydrogen, an alkyl group, an allyl group, a cyclohexyl group and a phenyl nucleus and $R_2$ represents a member selected from the group consisting of an alkyl group, an allyl group, a cyclohexyl group and a phenyl nucleus.

12. A cellulose acetate colored with a nuclear non-sulfonated azo dye compound having the general formula: R—N=N—B wherein R represents the residue of a member selected from the group consisting of an aryl nucleus of the benzene series and an aryl nucleus of the naphthalene series, B represents the residue of an aryl nucleus of the benzene series containing but one benzene ring and having a

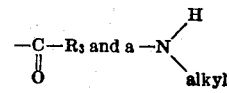

group attached thereto in ortho and para position, respectively, to the azo bond and wherein $R_3$ represents the residue of a member selected from the group consisting of an alkyl group and a phenyl nucleus.

JAMES G. McNALLY.
JOSEPH B. DICKEY.